United States Patent
Goel

(10) Patent No.: US 10,445,316 B2
(45) Date of Patent: *Oct. 15, 2019

(54) DYNAMIC GENERATION OF DATABASE QUERIES IN QUERY BUILDERS

(71) Applicant: Oracle International Corporation, Redwood Shores, CA (US)

(72) Inventor: Deepak Goel, Ghaziabad (IN)

(73) Assignee: Oracle International Corporation, Redwood Shores, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/871,998

(22) Filed: Jan. 16, 2018

(65) Prior Publication Data

US 2018/0137167 A1    May 17, 2018

Related U.S. Application Data

(63) Continuation of application No. 13/693,061, filed on Dec. 4, 2012, now Pat. No. 9,904,702.

(51) Int. Cl.
*G06F 16/00* (2019.01)
*G06F 16/242* (2019.01)

(52) U.S. Cl.
CPC .............. *G06F 16/2428* (2019.01)

(58) Field of Classification Search
CPC ............................................. G06F 16/2428
See application file for complete search history.

(56) References Cited

U.S. PATENT DOCUMENTS

| | | | |
|---|---|---|---|
| 5,418,950 | A | 5/1995 | Li et al. |
| 5,873,079 | A | 2/1999 | Davis, III et al. |
| 6,658,407 | B1 | 12/2003 | Bailey |
| 7,761,443 | B2 | 7/2010 | Bhaghavan et al. |
| 7,844,587 | B2 | 11/2010 | Blakeley et al. |
| 8,122,048 | B2 | 2/2012 | Dettinger et al. |

(Continued)

OTHER PUBLICATIONS

Comparison Operators, http://www.epa.gov/enviro/facts/pcs-icis/operatordefinition.html, Downloaded circa Jun. 8, 2012, pp. 1-1.

(Continued)

*Primary Examiner* — Sherief Badawi
*Assistant Examiner* — Lahcen Ennaji
(74) *Attorney, Agent, or Firm* — IPHorizons PLLC; Narendra Reddy Thappeta

(57) ABSTRACT

A query builder provided according to an aspect of the present invention facilitates users to conveniently generate database queries directed to database servers storing data elements organized according to attributes. In an embodiment, configuration data indicating a comparison predicate to be used for each combination of an attribute and a conditional operation is maintained. A user may then provide as inputs a first attribute, a first conditional operation and a first value. In response, the query builder examines the configuration data to determine a first comparison predicate specified for the combination of the first attribute and the first conditional operation. The query builder incorporates the first value in the first comparison predicate to construct a second comparison predicate and then forms a first database query with the second comparison predicate.

15 Claims, 5 Drawing Sheets

(56) References Cited

U.S. PATENT DOCUMENTS

| | | | |
|---|---|---|---|
| 8,131,748 B2 | 3/2012 | Held et al. | |
| 2004/0205050 A1 | 10/2004 | Stevens et al. | |
| 2008/0288465 A1* | 11/2008 | Payton | G06F 16/2428 |
| 2008/0306910 A1* | 12/2008 | Singh | G06F 16/832 |
| 2009/0024593 A1* | 1/2009 | Allen | G06F 16/2428 |
| 2009/0119277 A1 | 5/2009 | Dettinger et al. | |
| 2010/0185678 A1 | 7/2010 | Dettinger et al. | |
| 2011/0161343 A1 | 6/2011 | Schimpf et al. | |
| 2012/0084328 A1 | 4/2012 | Ishikawa et al. | |

OTHER PUBLICATIONS

Search, http://www.epa.gov/enviro/fac/pcs-icis/search.html, Downloaded circa Jun. 8, 2012, pp. 1-2.

Query Builder, http://www.pir.sa.gov.au/_data/assets/pdf_file/0018/126243/Query_builder.pdf, pp. 1-11.

Dynamic SQL, http://support.altibase.com/en/, Downloaded circa Jun. 8, 2012, pp. 1-3.

Dynamic query building—Autocomplete, http://social.technet.microsoft.com/forums/en-US/sharepointcustomizationprevious/thread/1f425384-7238-4ab1-9eed-1fd2cad292b9, Downloaded circa Jun. 8, 2012, pp. 1-2.

\* cited by examiner

| | Attribute | Condition | Table | Predicate |
|---|---|---|---|---|
| 341 | Company Product | Equal to | V_RPT_PRODUCT | V_RPT_CASE.CASE_ID = V_RPT_PRODUCT.CASE_ID and V_RPT_PRODUCT.PRODUCT_ID = (select PRODUCT_ID from V_DRUG_NAME where upper(PRODUCT_NAME) = upper('#PARAM#')) |
| 342 | Company Product | Not Equal to | V_RPT_PRODUCT | V_RPT_CASE.CASE_ID = V_RPT_PRODUCT.CASE_ID and V_RPT_PRODUCT.PRODUCT_ID = (select PRODUCT_ID from V_DRUG_NAME where upper(PRODUCT_NAME) <> upper('#PARAM#') and PRODUCT_NAME is null) |
| 343 | Company Product | Begin With | V_RPT_PRODUCT | V_RPT_CASE.CASE_ID = V_RPT_PRODUCT.CASE_ID and (upper(V_RPT_PRODUCT.PRODUCT_NAME) like upper('#PARAM#%')) |
| 344 | First Name | Equal to | | (upper(V_RPT_CASE.PAT_FIRSTNAME) = upper('#PARAM#')) |
| 345 | First Name | Begin With | | (upper(V_RPT_CASE.PAT_FIRSTNAME) like upper('#PARAM#%')) |
| 346 | Last Name | Equal to | | (upper(V_RPT_CASE.PAT_LASTNAME) = upper('#PARAM#')) |

*FIG. 3*

DYNAMIC GENERATION OF DATABASE QUERIES IN QUERY BUILDERS

RELATED APPLICATIONS

The present application is a continuation application of, and claims priority from, co-pending US Patent Application entitled, "DYNAMIC GENERATION OF DATABASE QUERIES IN QUERY BUILDERS", application Ser. No. 13/693,061, Filed: 4 Dec. 2012, and is incorporated in its entirety herewith.

BACKGROUND OF THE INVENTION

Technical Field

The present disclosure relates to server systems, and more specifically to dynamic generation of database queries in query builders.

Related Art

Database queries refer to statements, which are used to access data in a database server. Queries are typically received from external systems, and the result of processing each query is sent as a response to the corresponding requesting external system. The queries may be received according to languages such as SQL (structured query language) well known in the relevant arts.

A query builder refers to a utility, which facilitates non-technical users (e.g., business managers) to form database queries. In a typical implementation, a user merely provide various inputs required for forming desired conditions using a convenient GUI (graphical user interface), and the query builder then dynamically generates database queries containing the desired conditions based on the user provided inputs. The generated queries may be later executed for accessing the data matching the specific conditions, from a database server.

Due to the use of such query builders, users may be shielded from various low level details such as syntax/semantics of language of the database queries (as specific to the database server), the underlying data organization (e.g., the specific tables and columns) in the database server, any required set-up for establishing connections with the database server, etc.

It may be desirable to simplify generation of such database queries even when some of the low level details are changed (for example, when the underlying data is reorganized).

BRIEF DESCRIPTION OF THE DRAWINGS

Example embodiments of the present invention will be described with reference to the accompanying drawings briefly described below.

FIG. 3 depicts a portion of a configuration data used by a query builder for generating SQL queries in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A query builder provided according to an aspect of the present invention facilitates users to conveniently generate database queries directed to database servers storing data elements organized according to attributes. In an embodiment, configuration data indicating a comparison predicate to be used for each combination of an attribute and a conditional operation is maintained.

A user may then provide as inputs a first attribute, a first conditional operation and a first value. In response, the query builder examines the configuration data to determine a first comparison predicate specified for the combination of the first attribute and the first conditional operation. The query builder incorporates the first value in the first comparison predicate to construct a second comparison predicate and then forms a first database query with the second comparison predicate.

In one embodiment, the database server is implemented according to a relational database technology, with the query builder forming the first database query according to SQL (structured query language) as an SQL query.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
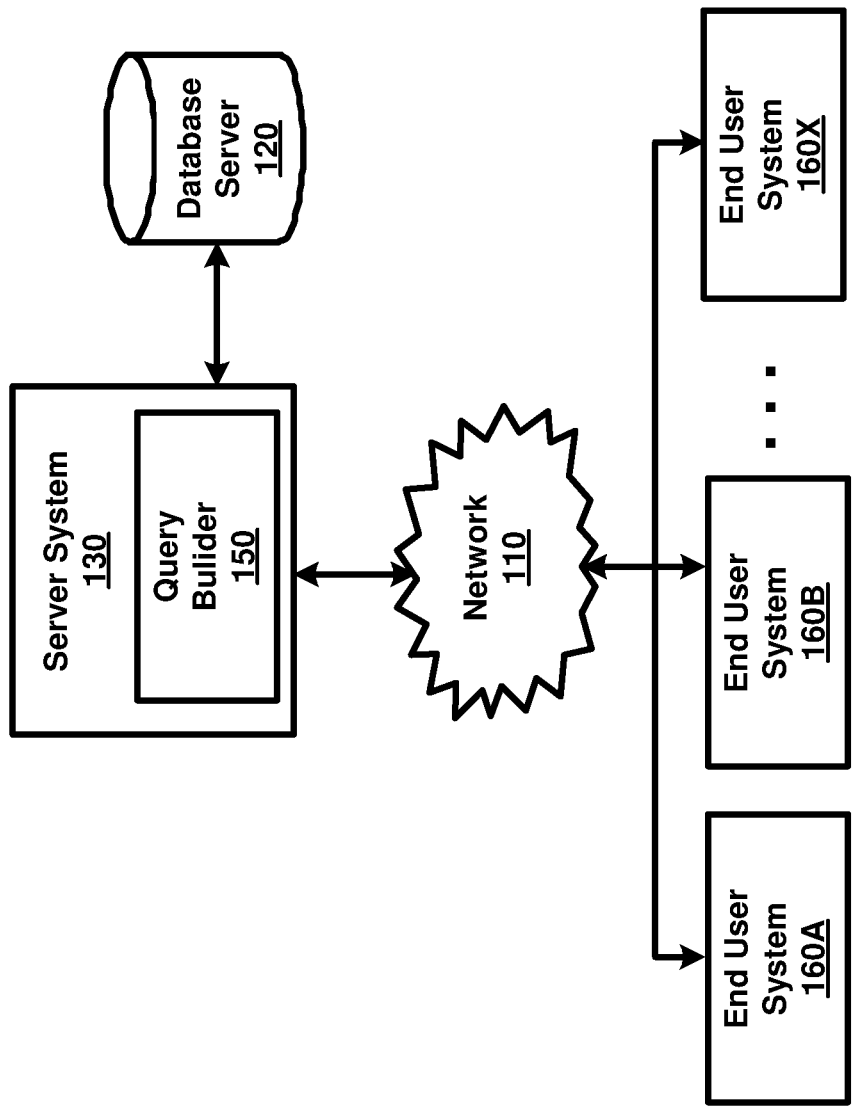
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing network 110, database server 120, server system 130 (shown executing query builder 150) and end user systems 160A-160X.

Merely for illustration, only representative number/type of systems is shown in FIG. 1. Many environments often contain many more systems, both in number and type, depending on the purpose for which the environment is designed. Each system/device of FIG. 1 is described below in further detail.

Network 110 provides connectivity between server system 130 and end user systems 160A-160X, and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered.

A (IP) packet is said to be directed to a target system when the destination IP address of the packet is set to the (IP) address of the target system, such that the packet is eventually delivered to the target system by network 110. When the packet contains content such as port numbers, which specifies the target application, the packet may be said to be directed to such application as well. Network 110 may be implemented using any combination of wire-based or wireless mediums.

Database server 120 represents a non-volatile (persistent) storage facilitating storage and retrieval of a collection of data by one or more applications executing in server system 130 (typically while processing various client requests). In one embodiment, database server 120 is implemented using relational database technologies (that is, the data is organized in the form of tables and columns having corresponding names) and therefore provides storage and retrieval of data using structured queries such as SQL (Structured Query Language). As is well known, SQL refers to a special-purpose, generally non-procedural language that supports the definition, manipulation, and control of data in systems implementing relational database technologies. However, database server 120 can be implemented using other technologies (e.g., other languages, hierarchical databases) in alternative embodiments.

A SQL query is generally of the form "SELECT columns FROM tables WHERE comparison predicate", where SELECT, FROM and WHERE are keyword in SQL, columns is a list of columns to be included in the result (with an asterisk ("*") indicating all columns), tables is a list of tables from which data is to be retrieved, and comparison predicate is a logical condition used to restrict the rows returned by the query. The comparison predicate typically contains one or more conditions (combined by logical operators such as AND, OR, NOT), with each condition specifying a column name (in a table), a comparison operator (such as "=", "LIKE", "IN", etc.) and a value to be compared with. In addition, the SQL query may contain a GROUP BY clause for grouping rows based on specified columns, a HAVING clause specifying a predicate used to filter rows resulting from the GROUP BY clause, and a ORDER BY clause for specifying the order of rows in the result.

Each of end user systems 160A-160X represents a system such as a personal computer, workstation, mobile station, mobile phone, computing tablet, etc., used by users to generate (client) requests directed to applications executing in server system 130. The requests may be generated using appropriate user interfaces provided by applications executing in server system 130 or in the end user system. In general, a user sends client requests for performing desired tasks and receives corresponding responses containing the results of performance of the requested tasks. Each request is sent in the form of an IP packet directed to server system 130 (and corresponding application), with the IP packet including data identifying the desired tasks in the payload portion.

Server system 130 represents a system such as a web/application server executing applications capable of performing tasks requested by users. In response to receiving a client requests from an end user system (such as 160A-160X), an application (to which the client request is directed to) executing in server system 130 performs the tasks specified in the request and sends the result of performance of the tasks to the requesting end user system. The application may use data stored internally (for example, in a non-volatile storage/hard disk within the server system), external data (for example, in database server 120) and/or data received from external sources (e.g., from the user) in performing such tasks.

Query builder 150 facilitates non-technical users using end user systems 160A-160X to dynamically create SQL queries for retrieving data from database server 120. Query builder 150 provides a graphical user interface (GUI) on an end user system (such as 160A-160X) that enables a user to provide various inputs for forming desired conditions (using the GUI). Query builder 150 then generates SQL queries based on the user provided inputs. The generated SQL queries may then be executed (either by query builder 150 or by a different module/application, not shown) or stored for later execution.

In the following disclosure, query builder 150 is assumed to be a stand-alone block/application executing in server system 130. However, in alternative embodiments, query builder 150 may be implemented within an application executing in server system 130, as an external module such as a Dynamic-link library (DLL) that is used/shared by multiple applications executing in server system 130 or an application utility executing in one of the end user systems. The features of the present invention can be implemented in such alternative embodiments as well, as will be apparent to one skilled in the relevant arts by reading the disclosure herein.

The manner in which query builder 150 dynamically generates SQL queries based on user provided inputs according to several aspects of the present invention is described below with examples.

3. Generating Database Queries

Figure 2:
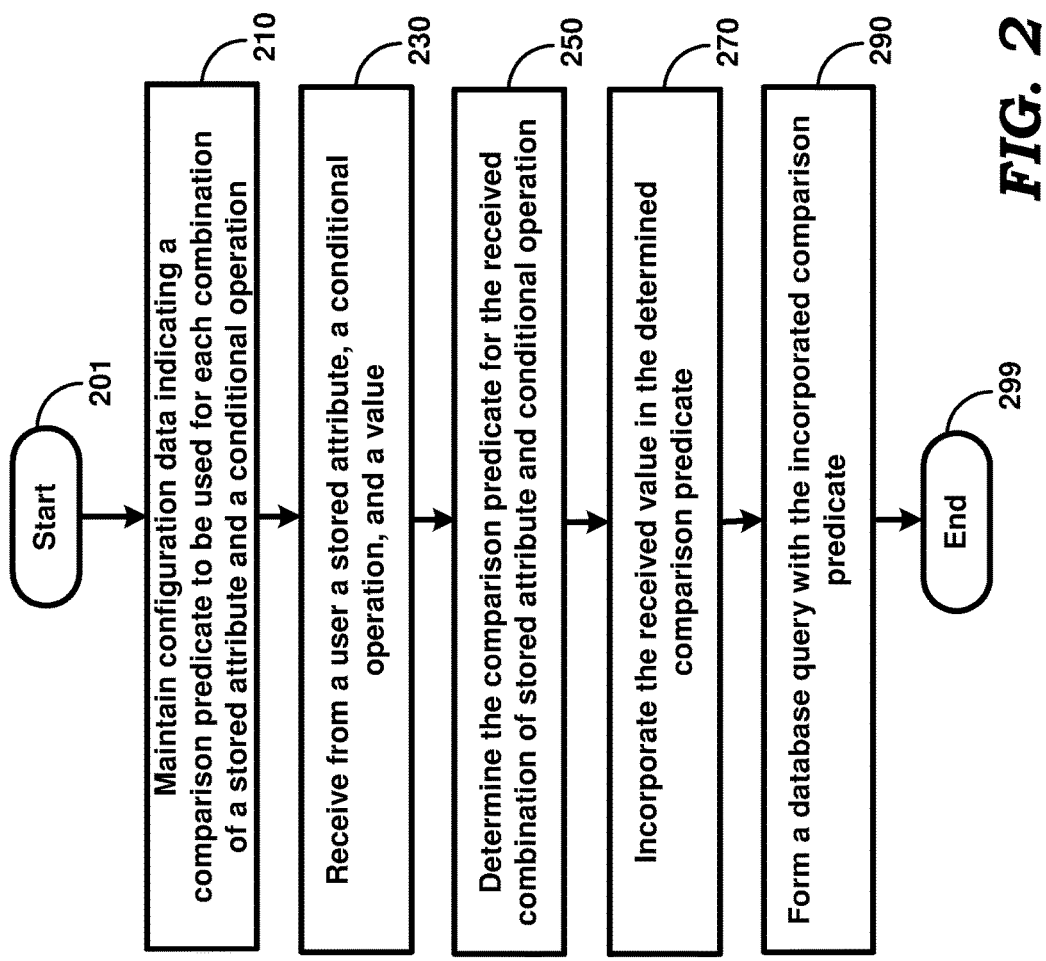
FIG. 2 is a flowchart illustrating the manner in which a query builder generates database queries according to an aspect of the present invention.

FIG. 2 is a flowchart illustrating the manner in which a query builder generates database queries according to an aspect of the present invention. The flowchart is described with respect to FIG. 1, and in relation to query builder 150 merely for illustration. However, the features can be implemented in other environments (and in other servers) also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, query builder 150 maintains a configuration data indicating a comparison predicate to be used for each combination of a stored attribute and conditional operation of interest. An (stored) attribute provides a common name for a group of data elements (that are stored in the database) sharing a characteristic. In case of relational databases, a stored attribute eventually maps to a column of a table of a stored relational database.

Evaluation of a conditional operation against data items results in a logical result. The conditional operation can be any of comparison operations (less than, equal to, between, etc.), state operations (exists, missing, contained in, begins with, etc). As noted above, a comparison predicate (specified as part of a SQL query) ensures that only the rows in the tables for which the comparison predicate evaluates to true are included in the result of processing of a corresponding SQL query.

The configuration data may be maintained in a persistent storage such as database server 120. The configuration data may be specified by developers of the query builder and/or applications executing in server system 130 or by administrators of server system 130.

In step 230, query builder 150 receives, from a user, a stored attribute, a conditional operation of interest, and a value (hereafter together referred to as a "conditional expression"). The conditional expression may be received from one of developer systems 160A-160X, in response to the user specifying the three inputs using a graphical user interface provided on the developer system by query builder 150.

In step 250, query builder 150 determines the comparison predicate for the received combination of stored attribute and conditional operation. The determination is performed by examining the configuration data, after retrieval from the persistent storage, and may be performed in a known way. For example, query builder 150 may first identify a combination in the configuration data the received stored attribute and conditional operations, and then determine the comparison predicate associated with the identified combination.

In step 270, query builder 150 incorporates the received value in the determined comparison predicate. According to a convention described below, the comparison predicate in the configuration data includes place holders for values to be specified by the users. Incorporation in such convention therefore entails replacing the place holders with the corresponding user provided values. Query builder 150 may perform any appropriate conversions of the received value before performing such replacements.

In step 290, query builder 150 forms a database query with the incorporated comparison predicate, for example, as the WHERE clause of a SQL query. The columns and tables (in the FROM clause) may be determined by query builder 150 by inspecting the comparison predicate. Alternatively, the configuration data may be designed to also indicate (in addition to the comparison predicate) the specific columns/tables to be included in the SQL query. As noted above, the formed SQL query may be executed or stored for later execution. The flow chart ends in step 299.

Thus, query builder 150 dynamically generates SQL queries based on user provided inputs. It should be noted that the steps of 230, 250 and 270 can be iterated by a user to specify a complex condition having multiple conditional expressions. The step of 290 may be performed only after the user has specified the desired set of conditional expressions.

It may be appreciated that any changes required to SQL queries in view of situations such as changes to the business logic (such as the manner of retrieval) and/or the organization of data (such as the structures of the tables/columns), can be effected by modifying the comparison predicates in the configuration data (in view of the techniques described above). The programming logic for the generation of the SQL query embedded within (the instructions constituting) query builder 150 need not accordingly be modified in response to such changes.

The manner in which query builder 150 dynamically generates SQL queries according to the foregoing description, is illustrated below with examples.

4. Illustrative Example

Figure 4:
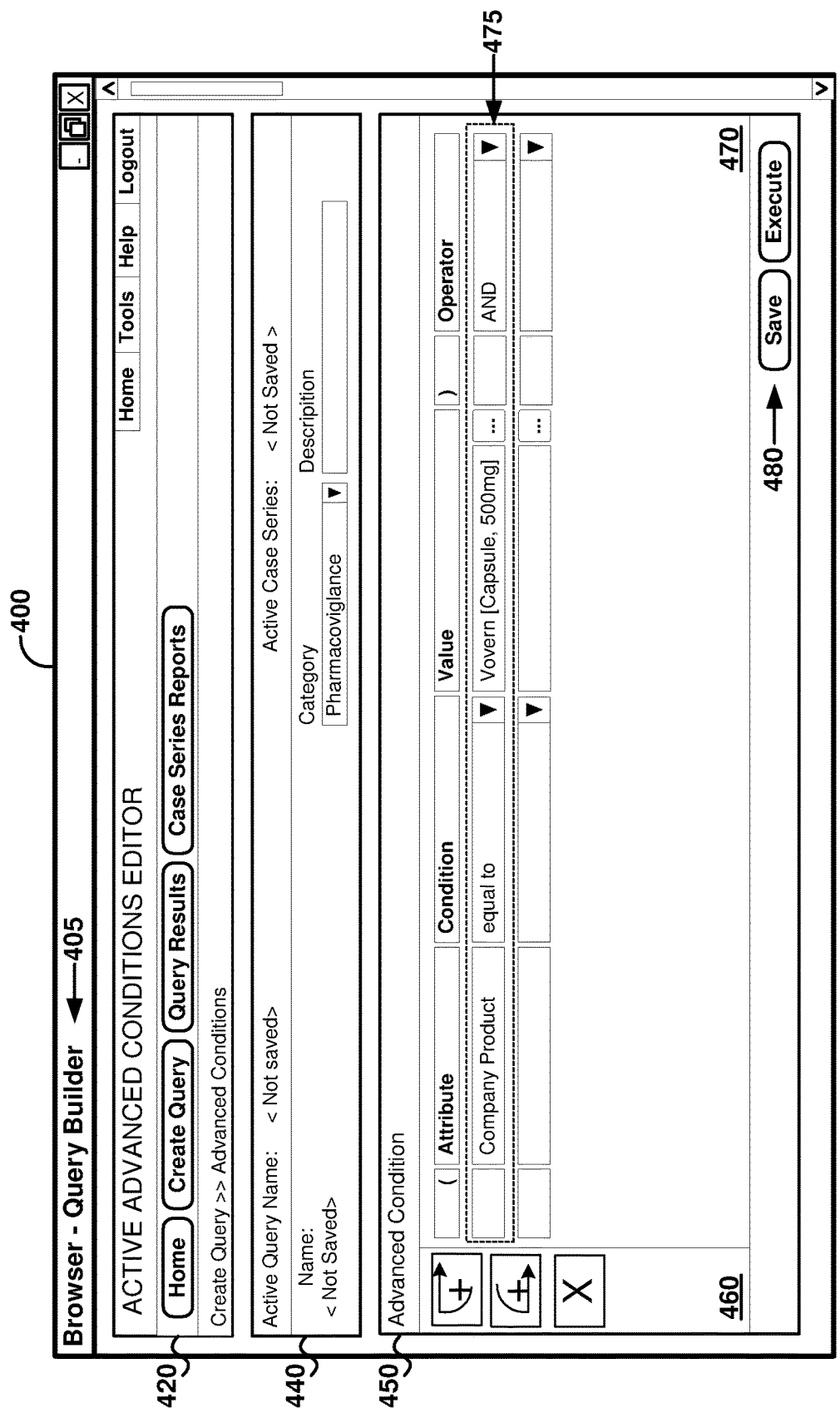
FIG. 4 depicts a graphical user interface (GUI) provided by a query builder in one embodiment.

FIGS. 3 and 4 together illustrate the manner in SQL queries are dynamically generated in query builders (in particular, query builder 150) in one embodiment. Each of the Figures is described in detail below.

FIG. 3 depicts a portion of a configuration data used by a query builder (150) for generating SQL queries in one embodiment. For illustration, the configuration data is shown maintained in the form of a table (300) in database server 120. However, in alternative embodiments, the configuration data may be maintained using other data formats such as extensible markup language (XML), as will be apparent to one skilled in the relevant arts by reading the disclosure herein.

Table 300 depicts portions of configuration data maintained by query builder 150. In particular, columns 321 "Attribute" and 322 "Condition" specifies a combination of the (name of) a stored attribute and a conditional operation, while columns 323 "Table" and 324 "Predicate" respectively specifies the table and comparison predicate for the corresponding combination.

Thus, each of rows 341-346 specifies the corresponding table and comparison predicate to be used for a combination of stored attribute and conditional operation. For example, row 341 indicates that the table "V_RPT_PRODUCT" table is to be included in the FROM clause and the predicate "V_RPT_CASE.CASE_ID=V_RPT_PRODUCT.CASE_ID and V_RPT_PRODUCT.PRODUCT_ID=(select PRODUCT_ID from V_DRUG_NAME where upper(PRODUCT_NAME)=upper('#PARAM#'))" is to be used in the WHERE clause for the combination of the stored attribute "Company Product" and conditional operation "Equal to". It may be observed that the predicate contains the text "#PARAM#" indicating a place holder for a (user provided) value to be later incorporated. Similarly other rows 342-346 specify the table and predicate to be used for corresponding combinations.

In the following description it is assumed that all the generated SQL queries retrieve the values in the default table/column "V_RPT_CASE.case_id" and that the default table "V_RPT_CASE" is to be included in the FROM clause in addition to the tables specified in column 423. However, in alternative embodiments, the specific columns to be retrieved and the specific tables to be used may be specified as part of configuration data (table 300), as will be apparent to one skilled in the relevant arts.

It may be appreciated that the configuration data indicates that different predicates are to be used for different combinations of stored attributes and conditional operations. The predicates may be specified by a developer/administrator based on the underlying business logic (for example, how are company products to be retrieved in relation to cases) to be used, the data organization (tables V_RPT_CASE, V_RPT_REPORT) in database server 120, any optimizations that can be performed during retrieval, etc. In a scenario that there is a change in the business logic or data organization, the developer/administrator is required to only modify the predicates in column 324 of table 300, with query builder 150 then using the modified predicates for the generation of the SQL queries.

Thus, query builder 150 maintains configuration data (300) indicating the specific comparison predicates to be used for each combination of stored attribute and conditional operation. Query builder 150 then generates SQL queries based on such configuration data (300) and user provided inputs. The manner in which a user is enabled to provide inputs for generating SQL queries is described below with examples.

5. Graphical User Interface

FIG. 4 depicts a graphical user interface (GUI) provided by a query builder (150) in one embodiment. Display area 400 depicts a portion of a user interface provided on a display unit (not shown in FIG. 1) associated with one of end user systems (assumed to be 160A, for illustration). In one embodiment, display area 400 corresponds to a browser (as indicated by the text in display area 405) displaying a web page provided by query builder 150, in response to a user sending a request from end user system 160A.

Display area 420 enables a user to create a new query (advanced condition) by clicking the "Create Query" button and to view the results of executing previously created queries by clicking the "Query Results" button. The description is continued assuming that the user has selected the "Create Query" button to specify a new query. Display area 440 enables to user to name and save the newly created query, thereby enabling the user to later execute the saved query. The text "<Not Saved>" in display area 440 indicates that the user has not yet named/saved the current query.

Display area 450 enables the user to provide various inputs for forming desired conditional expressions. In particular, the user specifies a stored attribute (by selecting or entering the name in the "Attribute" column), a conditional operation (by selecting from the options provided in "Condition" column), and a value to be used for comparison (by searching for or entering in the "Value" column). The user may also combine multiple conditional expressions using logical operators such as AND, OR, AND NOT, etc. (by selecting the appropriate option in the "Operator" column).

It may be observed that each of the conditional expressions is specified in a corresponding row (such as row 475) in display area 470. A user may select the buttons shown in display area 460 for adding new rows/conditions or removing older rows/conditions from display area 470. For example, a user may click/select the buttons labeled with a "+" in display area 460 to add a row (either before or after the currently selected row indicated by the dotted boundary, i.e., row 475) in display area 470, and may click/select the button labeled with a "x" in display area 460 to remove the currently selected row (i.e., row 475).

It may be appreciated that the conditional expressions specified in the set of rows in display area 470 represents a complex conditional expression based on which the SQL query is sought to be generated. A user may also select the opening bracket "(" and closing bracket ")" columns to specify sub-expressions in the complex conditional expression in display area 370. An example of such a complex conditional expression having sub-expressions is "Report Type equal to Spontaneous AND (Country equal to United States OR Country equal to Australia)", where Report Type and Country are specified in the "Attribute' column; "equal to" is specified in the "Condition' column; Spontaneous, United States and Australia are specified in the 'Value' column; "AND" and "OR" are specified in the 'Operator' column; and the opening and closing brackets are selected in the appropriate "(" and ")" columns.

Thus, a user using the user interface of FIG. 3 is facilitated to specify various inputs for forming the desired conditions/ conditional expression. The description is continued assuming that the user has specified the one conditional expression in the form "Company Product", "Equal to" and "Vovern [Capsule, 500 mg]" shown in display area 470. The user may then (after specifying a name using an interface not shown) click/select the "Save" button in display area 480 to indicate that a SQL query is to be generated (based on the specified conditional expression) and stored for later execution. Alternatively, the user may click on "Execute" button in display area 480 to indicate that a SQL query is to be generated and immediately executed.

In response to a user selecting the Save or Execute buttons, query builder 150 generates a SQL query based on the conditions/inputs specified by the user in display area 470. In the embodiment noted above, the browser sends the inputs specified in display area 470 in the form of IP packets directed to server system 130 (in particular query builder 150). Query builder 150 then generates the SQL query in response to receiving the IP packets from the browser. The manner in which query builder 150 generates/forms a SQL query based on the user provided inputs (of display area 470) and configuration data (300) is described below with examples.

6. Generating a SQL Query

In response to receiving the user inputs "Company Product", "Equal to" and "Vovern [Capsule, 500 mg]", query builder 150 first examines configuration data 300 to determine the comparison predicate for the received combination of stored attribute "Company Product" and conditional operation "Equal to". Query builder 150 may accordingly identify that row 341 corresponds to the received combination and that predicate indicated in column 324 of row 341 is to be used in the SQL query.

Query builder 150 then incorporates the received value in the determined predicate by replacing the one occurrence of the text "#PARAM#" in the determined predicate with the received value "Vovern [Capsule, 500 mg]". Query builder 150 then forms the SQL query by using the default column "V_RPT_CASE.case id", the tables "V_RPT_CASE" (default table) and "V_RPT_PRODUCT" (the value in column 323 of row 341) in the FROM clause and the incorporated predicate in the WHERE clause. Thus, query builder 150 may form the below noted query in response to receiving the values shown in display area 470:

SELECT DISTINCT V_RPT_CASE.case_id
FROM V_RPT_CASE, V_RPT_PRODUCT
WHERE
(V_RPT_CASE.CASE_ID=V_RPT_PRODUCT.
CASE_ID
  and V_RPT_PRODUCT.PRODUCT_ID=(select PRODUCT_ID
    from V_DRUG_NAME
    where upper(PRODUCT_NAME)=upper('Vovern [Capsule, 500 mg]'))

Thus, query builder 150 generates a SQL query based on user provided inputs (shown in display area 470) and configuration data (300). Query builder 150 may then execute or store (based on whether the user selected "Execute" button or "Save" button in display area 480) the above generated SQL query.

In a scenario that a complex condition (having multiple conditional expressions) is specified by the user in display area 470, query builder 150 may first identify the predicates for each of the combinations in the multiple conditional expressions, incorporate the values specified in the corresponding conditional expressions in the determined predicates and then combine the incorporated predicates based on the logical operators (AND, OR, etc.) specified by the user. The SQL query may then be formed using the combined predicate corresponding to all the conditional expressions in the complex condition. Furthermore, query builder 150 may also receives data indicating sub-expressions and process them by adding corresponding sub-expressions in the generated SQL query.

It should be appreciated that though several features of the present invention are described above with respect to the "SELECT" SQL statement, in alternative embodiments, the features of the present invention may be implemented in the context of other types of conditional SQL statements (such as INSERT, UPDATE and DELETE) as well, as will be apparent to one skilled in the relevant arts by reading the disclosure herein.

It should be further appreciated that the features described above can be implemented in various embodiments as a desired combination of one or more of hardware, executable modules, and firmware. The description is continued with respect to an embodiment in which various features are operative when corresponding executable modules are executed.

7. Digital Processing System

Figure 5:
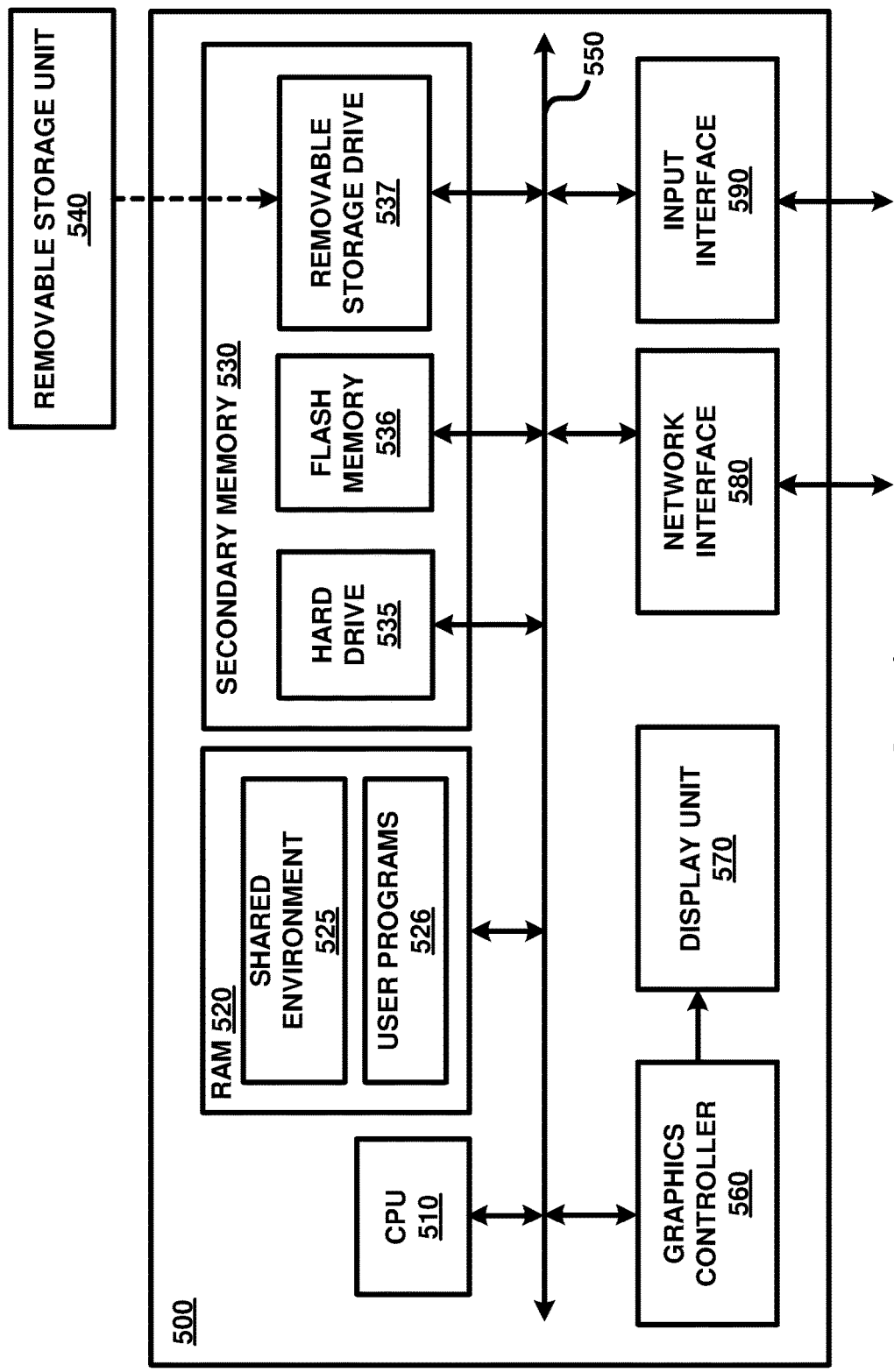
FIG. 5 is a block diagram illustrating the details of a digital processing system in which several aspects of the present invention are operative by execution of appropriate executable modules.

FIG. 5 is a block diagram illustrating the details of digital processing system 500 in which several aspects of the present invention are operative by execution of appropriate executable modules. Digital processing system 500 may correspond to any system (such as server system 130) executing query builder 150 or any one of end user systems 160A-160X.

Digital processing system 500 may contain one or more processors (such as a central processing unit (CPU) 510), random access memory (RAM) 520, secondary memory 530, graphics controller 560, display unit 570, network interface 580, and input/ output interface 590. All the components except display unit 570 may communicate with each other over communication path 550, which may contain several buses as is well known in the relevant arts.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550. RAM 520 is shown currently containing software instructions constituting shared environment 525 and/or user programs 526. Shared environment 525 contains utilities shared by user programs, and such shared utilities include operating systems, virtual machines, etc., which provide a (common) run-time environment for execution of user programs 526 (such as browsers, email client software).

Graphics controller 560 generates display signals (e.g., in RGB format) to display unit 570 based on data/instructions received from CPU 510. Display unit 570 contains a display screen to display the images defined by the display signals (for example, portions of the user interface shown in FIG. 4). Input/output interface 590 includes input as well as output devices to enable a user to interact with system 500 (for example, to interact with the user interface of FIG. 4 such as selecting the desired stored attributes, conditional operations, specifying values). Network interface 580 provides the physical, electrical and protocol implementations that enable system 500 to communicate with other systems of FIG. 1 using protocols such as TCP/IP.

Secondary memory 530 (representing a non-transitory storage/medium) may contain hard drive 535, flash memory 536, and removable storage drive 537. Secondary memory 530 may store data (for example, portions of configuration data shown in FIG. 3, portions of the user provided inputs, portions of the generated SQL queries) and software instructions (for example, for performing the steps of FIG. 2), which enable digital processing system 500 to provide several features in accordance with the present invention, as described above.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 530. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of generating database queries directed to a database server implemented according to a relational database technology, said database server storing data elements organized as tables according to said relational database technology, with each table containing a corresponding set of columns, wherein each column is identified by a corresponding column name, said method comprising:

receiving from an administrator a configuration data containing a plurality of entries, each entry specifying a corresponding comparison predicate to be used for a respective combination of a common name and a conditional operation, wherein the comparison predicate of each entry specifies a manner in which data corresponding to said common name can be retrieved from said database server according to said relational database technology based on said column names;

storing said configuration data in a persistent storage;

receiving from a user an input data specifying a first common name, a first conditional operation and a first value, wherein said plurality of entries are present stored in said persistent storage as said configuration data prior to said receiving;

examining said configuration data to identify a first entry of said plurality of entries, said first entry having said respective combination which matches the combination of said first common name and said first conditional operation, wherein said first entry specifies a first comparison predicate for the combination, wherein said first comparison predicate specifies the column name of a first column in a first table and a second column in a second table according to said relational database technology, wherein the column name of said first column is represented as a text which is different from that representing said first common name;

incorporating said first value in said first comparison predicate to construct a second comparison predicate, wherein said second comparison predicate includes the column names of said first column and said second column;

forming a first database query with said second comparison predicate including the column names of said first column and said second column, wherein said first database query is formed according to said relational database technology, wherein said first database query, upon execution in said database server causes retrieval of data in said first column corresponding to said first common name in view of said first database query including the column name of said first column and constrains the data in said first column by the values in said second column in view of said first database query including the column name of said second column.

2. The method of claim 1, wherein said first database query is an SQL (structured query language) query specifying a join operation between said first table and said second table based on said second column.

3. The method of claim 2, wherein said forming comprises including said second comparison predicate in a WHERE clause of said SQL query.

4. The method of claim 3, wherein said forming further comprises including a set of columns to be retrieved in a SELECT clause of said SQL query, and a set of tables containing said set of columns in a FROM clause of said SQL query.

5. The method of claim 1, wherein said user does not specify said second column as a part of said input data.

6. A non-transitory machine readable medium storing one or more sequences of instructions for causing a system to generate database queries directed to a database server implemented according to a relational database technology, said database server storing data elements organized as tables according to said relational database technology, with each table containing a corresponding set of columns, wherein each column is identified by a corresponding column name, wherein execution of said one or more instructions by one or more processors contained in said system causes said system to perform the actions of:

receiving from an administrator a configuration data containing a plurality of entries, each entry specifying a corresponding comparison predicate to be used for a respective combination of a common name and a conditional operation, wherein the comparison predicate of each entry specifies a manner in which data corresponding to said common name can be retrieved from said database server according to said relational database technology based on said column names;

storing said configuration data in a persistent storage;

receiving from a user an input data specifying a first common name, a first conditional operation and a first value, wherein said plurality of entries are present stored in said persistent storage as said configuration data prior to said receiving;

examining said configuration data to identify a first entry of said plurality of entries, said first entry having said respective combination which matches the combination of said first common name and said first conditional operation, wherein said first entry specifies a first comparison predicate for the combination, wherein said first comparison predicate specifies the column name of a first column in a first table and a second column in a second table according to said relational database technology, wherein the column name of said first column is represented as a text which is different from that representing said first common name;

incorporating said first value in said first comparison predicate to construct a second comparison predicate, wherein said second comparison predicate includes the column names of said first column and said second column;

forming a first database query with said second comparison predicate including the column names of said first column and said second column, wherein said first database query is formed according to said relational database technology, wherein said first database query, upon execution in said database server causes retrieval of data in said first column corresponding to said first common name in view of said first database query including the column name of said first column and constrains the data in said first column by the values in said second column in view of said first database query including the column name of said second column.

7. The non-transitory machine readable medium of claim 6, wherein said first database query an SQL (structured query language) query specifying a join operation between said first table and said second table based on said second column.

8. The non-transitory machine readable medium of claim 7, wherein said forming comprises one or more instructions for including said second comparison predicate in a WHERE clause of said SQL query.

9. The non-transitory machine readable medium of claim 8, wherein said forming further comprises one or more instructions for including a set of columns to be retrieved in a SELECT clause of said SQL query, and a set of tables containing said set of columns in a FROM clause of said SQL query.

10. The non-transitory machine readable medium of claim 6, wherein said user does not specify said second column as a part of said input data.

11. A digital processing system comprising:
a processor;
a random access memory (RAM);
a machine readable medium to store one or more instructions, which when retrieved into said RAM and executed by said processor causes said digital processing system to generate database queries directed to a database server implemented according to a relational database technology, said database server storing data elements organized as tables according to said relational database technology, with each table containing a corresponding set of columns, wherein each column is identified by a corresponding column name, said digital processing system performing the actions of:
receiving from an administrator a configuration data containing a plurality of entries, each entry specifying a corresponding comparison predicate to be used for a respective combination of a common name and a conditional operation, wherein the comparison predicate of each entry specifies a manner in which data corresponding to said common name can be retrieved from said database server according to said relational database technology based on said column names;
storing said configuration data in a persistent storage;
receiving from a user an input data specifying a first common name, a first conditional operation and a first value, wherein said plurality of entries are present stored in said persistent storage as said configuration data prior to said receiving;
examining said configuration data to identify a first entry of said plurality of entries, said first entry having said respective combination which matches the combination of said first common name and said first conditional operation,
wherein said first entry specifies a first comparison predicate for the combination, wherein said first comparison predicate specifies the column name of a first column in a first table and a second column in a second table according to said relational database technology, wherein the column name of said first column is represented as a text which is different from that representing said first common name;
incorporating said first value in said first comparison predicate to construct a second comparison predicate, wherein said second comparison predicate includes the column names of said first column and said second column;
forming a first database query with said second comparison predicate including the column names of said first column and said second column, wherein said first database query is formed according to said relational database technology,
wherein said first database query, upon execution in said database server causes retrieval of data in said first column corresponding to said first common name in view of said first database query including the column name of said first column and constrains the data in said first column by the values in said second column in view of said first database query including the column name of said second column.

12. The digital processing system of claim 11, wherein said first database query is an SQL (structured query language) query specifying a join operation between said first table and said second table based on said second column.

13. The digital processing system of claim 12, wherein said forming comprises including said second comparison predicate in a WHERE clause of said SQL query.

14. The digital processing system of claim 13, wherein said forming further comprises including a set of columns to be retrieved in a SELECT clause of said SQL query, and a set of tables containing said set of columns in a FROM clause of said SQL query.

15. The digital processing system of claim 11, wherein said user does not specify said second column as a part of said input data.

* * * * *

UNITED STATES PATENT AND TRADEMARK OFFICE
CERTIFICATE OF CORRECTION

PATENT NO. : 10,445,316 B2  
APPLICATION NO. : 15/871998  
DATED : October 15, 2019  
INVENTOR(S) : Goel Page 1 of 1

It is certified that error appears in the above-identified patent and that said Letters Patent is hereby corrected as shown below:

On the Title Page

On page 2, Column 1, under Other Publications, Line 1, delete "/fac/" and insert -- /facts/ --, therefor.

In the Specification

In Column 6, Line 20, delete ""V_RPT_PRODUCT"" and insert -- "V_RPT_PRODUCT" --, therefor.

In Column 7, Line 49, delete ""Attribute"" and insert -- "Attribute" --, therefor.

In Column 7, Line 50, delete ""Condition"" and insert -- "Condition" --, therefor.

Signed and Sealed this  
Fifteenth Day of September, 2020

Andrei Iancu  
*Director of the United States Patent and Trademark Office*